US007011063B2

(12) United States Patent
Condemine et al.

(10) Patent No.: US 7,011,063 B2
(45) Date of Patent: Mar. 14, 2006

(54) METHOD OF STOPPING AND RESTARTING AN INTERNAL COMBUSTION ENGINE WITH INDIRECT INJECTION

(75) Inventors: Eric Condemine, Chatillon (FR); Vincent Basso, Forges (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/484,700

(22) PCT Filed: Jul. 26, 2002

(86) PCT No.: PCT/FR02/02693

§ 371 (c)(1),
(2), (4) Date: Jun. 28, 2004

(87) PCT Pub. No.: WO03/012273

PCT Pub. Date: Feb. 13, 2003

(65) Prior Publication Data

US 2004/0216719 A1 Nov. 4, 2004

(30) Foreign Application Priority Data

Jul. 27, 2001 (FR) .................................. 01 10131

(51) Int. Cl.
*F02N 11/08* (2006.01)

(52) U.S. Cl. ............................. 123/179.4; 123/179.3; 290/38 B (58) Field of Classification Search ............. 123/179.3, 123/179.4, 179.5, 179.16, 179.26, 179.28, 123/406.47, 198 DB; 290/35, 31, 38 R, 290/38 B
See application file for complete search history.

(56) References Cited

U.S. PATENT DOCUMENTS

| 4,364,343 A | 12/1982 | Malik |
| 5,447,143 A * | 9/1995 | Ott et al. ..................... 123/612 |
| 6,098,585 A | 8/2000 | Brehob et al. |

(Continued)

FOREIGN PATENT DOCUMENTS

DE  195 27 503  1/1997

(Continued)

OTHER PUBLICATIONS

Patent Abstracts of Japan, Publication No. 2001152891, dated Jun. 5, 2001. See PCT search report.

*Primary Examiner*—Henry C. Yuen
*Assistant Examiner*—Arnold Castro
(74) *Attorney, Agent, or Firm*—Nicolas E. Seckel (57) ABSTRACT

The speed of rotation and the angular position of the rotating part (2, 3) of the engine (1) are measured continuously, and the fuel injection is cut off at predetermined speed and angular position values of the rotating part (2, 3) in order to stop the engine in a predetermined position that facilitates restarting the engine. In order to restart the engine, using a starter (4), fuel is injected into at least one cylinder of the engine when the piston moving in the cylinder is in a determined position. The spark ignition and/or fuel injection is interrupted at predetermined speed and angular position values of the rotating part (2, 3) of the engine (1), and fuel is injected into at least one cylinder of the engine (1) during the last revolution of the engine before stopping. In order to restart the engine, ignition is carried out in at least one cylinder, the piston of which is in the compression position at the moment when the engine (1) stops.

20 Claims, 5 Drawing Sheets

U.S. PATENT DOCUMENTS

| | | | |
|---|---|---|---|
| 6,202,614 B1 * | 3/2001 | Grob et al. | 123/179.3 |
| 6,218,799 B1 * | 4/2001 | Hori | 318/446 |
| 6,425,362 B1 * | 7/2002 | Kanno | 123/179.16 |
| 6,434,453 B1 * | 8/2002 | Kuroda et al. | 701/22 |
| 6,453,864 B1 * | 9/2002 | Downs et al. | 123/179.3 |
| 6,499,342 B1 * | 12/2002 | Gonzales, Jr. | 73/117.3 |

FOREIGN PATENT DOCUMENTS

| | | |
|---|---|---|
| EP | 0 990 784 | 4/2000 |
| EP | 1 036 928 | 9/2000 |
| WO | WO 01/44636 | 6/2001 |
| WO | WO 01/48373 | 7/2001 |

* cited by examiner

FIG.5 (START)

FIG.5 (END)

FIG.6

METHOD OF STOPPING AND RESTARTING AN INTERNAL COMBUSTION ENGINE WITH INDIRECT INJECTION

The invention relates to a method of stopping and restarting an internal combustion engine with indirect injection.

Internal combustion engines comprise at least one piston that can be moved in a reciprocating manner in a cylinder, and generally a plurality of mounted pistons that are each movably mounted in a cylinder, the piston or each of the pistons being connected to a crankshaft by a connecting rod driving the crankshaft in rotation about a shaft.

The conditions for restarting a thermal engine, after the moving parts of the engine have stopped, i.e., in particular, the pistons and the crankshaft, are highly dependent on the stopping position of the moving parts. The power required to restart an engine can vary, for example, between a minimum value and a maximum value, which is 30% greater than the minimum value. Moreover, the time required to restart an engine (calculated, for example, in terms of the number of revolutions of the crankshaft) is also highly dependent on the stopping conditions of the engine, in the case of both spark ignition engines and compression ignition engines.

In the case of an in-line four-cylinder engine, there are four possible engine stopping positions, in which the positions of the pistons are different, between the top dead centers and the bottom dead centers of these pistons. The stopping position of a four-cylinder engine is thus defined to within 180°, i.e. with an approximation of half a revolution with regard to thug position of the crankshaft.

Moreover, around these stopping positions, the friction of the moving parts of the engine causes a dispersion of the order of a plurality of tens of degrees (for example, 30°).

These dispersions of the stopping points of the engine result in irregularities during starting, considerable starting times and pollution, which can be significant and which is poorly controlled, owing to incomplete combustion in the cylinders.

It has been proposed that the position of the moving parts of the engine should be controlled, during the stoppage of the engine, or rectified, after the engine has stopped, using an auxiliary electric machine. It is therefore necessary to use a specific electric machine and means of controlling this electric machine for braking or returning the engine to its stopping position. In the case of engines of modern design, with indirect injection, i.e. with injection of fuel into the inlet manifolds of the engine, there is a particularly precise and sensitive means that is associated with control means, such as a computer, for synchronizing the fuel injection with the positions of the pistons in the cylinders.

The injection system of these engines and these control means have, however, never before been used to control the stopping and restarting of an engine in a determined position.

In the case of engines with indirect injection (i.e. with injection into the inlet manifolds of the cylinders) and with spark ignition, the starting time is relatively long (generally greater than 0.5 seconds). The engine computer of modern vehicles has to go through a succession of highly precise stages before it reaches a normal operation configuration to control the engine after it has started. The time devoted to this process significantly increases the starting times, which are generally much longer than starts carried out with a conventional system comprising a carburetor and a contact breaker.

With each starting, the computers of modern vehicles have to synchronize the injection and the ignition, then give the order to inject and, finally, control the ignition.

Furthermore, this process causes pollution, as the first injections into the manifold are not synchronized; the injections are carried out on all, or almost all, of the cylinders; petroleum feedstock is released and can thus generally damage the catalyst, placed on the exhaust line, and/or cause pollution.

It seems necessary to reduce the starting times and limit the polluting emissions of modern engines, in particular for implementing a so-called "stop and start" operation, which is implemented automatically by the computer of a motor vehicle to stop and restart the vehicle, as a function of the traffic conditions. In particular, when the vehicle stops, for example because it is in a queue of vehicles which have stopped, the computer controls the stopping of the engine and then its restarting when the vehicle can move off again.

In this case, as the engine generally stops only for a short period, starting is carried out while the engine is hot, and it is necessary to obtain very rapid hot restart conditions for the spark ignition engine, which do not produce additional pollution in the exhaust gases.

The object of the invention is therefore to propose a method of stopping and restarting an internal combustion engine with indirect injection and spark ignition, comprising at least one cylinder, in which a piston, a fuel inlet manifold communicating with the cylinder, and a rotating part set in rotation by the piston, via a connecting rod, which allows very rapid hot restarts to be carried out and does not produce any additional pollution in the exhaust gases, move.

With this object:
the speed of rotation and the position of the piston and of the rotating part of the engine are measured continuously, and the fuel injection is cut off at predetermined speed and angular position values of the rotating part of the engine, in order to stop the piston and the rotating part in a predetermined position
a fuel feedstock is injected into the inlet manifold of the cylinder, in the intake phase, during the last revolution of the engine before it stops in a predetermined position,
in order to restart the engine after it has been stopped by setting the rotating part of the engine in rotation, the implementation of the compression phase in the cylinder is identified and ignition of the feedstock is carried out in the cylinder in the compression phase, and
the successive feedstock injection and ignition in at least one cylinder are carried out according to a predetermined sequence, in order to optimize consumption and emissions and to limit overspeeding of the engine during starting, thus improving the quality of the start.

To carry out the restarting, according to the invention, a desired quantity of fuel, which is determined during the development of the rapid hot starting operations, is injected into the cylinder.

In order to facilitate understanding of the invention, a method of stopping and restarting an internal combustion engine with spark ignition and indirect injection, according to the invention, will be described by way of example.

Figure 1:
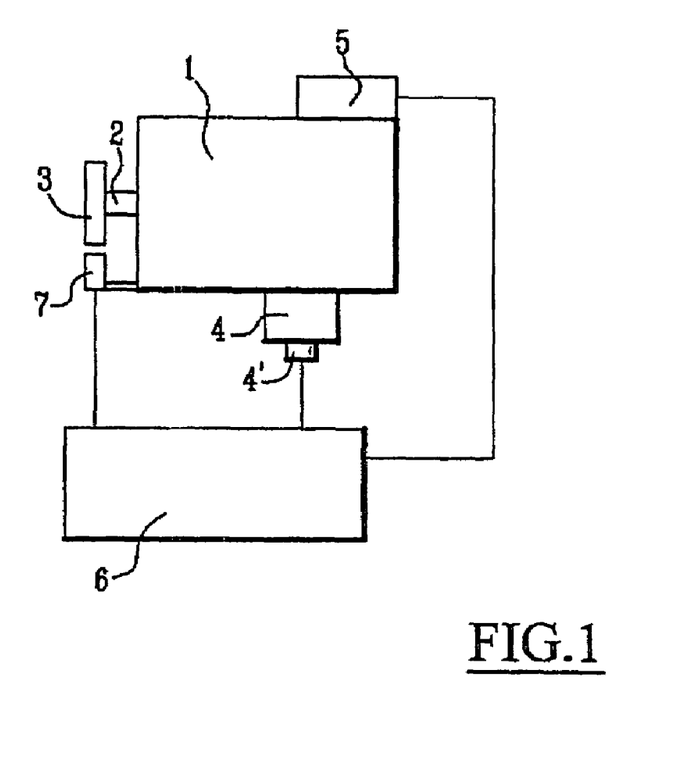
FIG. 1 is a diagram showing the means used to implement the method of stopping and restarting an engine with direct injection and spark ignition, according to the invention.

FIG. 1 shows schematically a thermal engine 1, which is, for example, an in-line four-cylinder engine.

The engine 1 comprises four cylinders (referred to hereinafter as $C_1$, $C_2$, $C_3$, $C_4$), in each of which a piston, which is connected, via a connecting rod, to a crankshaft 2 that is integral, at one of its ends, with a flywheel 3, moves.

The pistons with alternating movements, the connecting rods and the crankshaft 2 and flywheel 3, which can be set in rotation, represent all of the mobile elements of the engine 1.

The engine 1 comprises a starter 4, which may consist of an electric motor or of a reversible alternator. The starter 4 comprises a control element 4', which allows the electrical supply of the starter 4 from the battery of the motor vehicle to be established or cut off.

The engine 1 is an engine with indirect injection of fuel into the inlet manifolds of each of the cylinders of the engine. The injectors are controlled by an electronic control box 5, which allows the injections to be synchronized with the displacement of the mobile elements of the engine 1.

The motor vehicle in which the engine 1 is installed comprises a computer 6, which allows various functions for monitoring and controlling the motor vehicle, and in particular the engine 1, to be performed.

In particular, the computer 6 is connected to the box 5 controlling the injection of fuel into the cylinders of the engine, so as to synchronize the fuel injection with the position of the pistons and to stop the injection of fuel into the inlet manifolds of the cylinders at a determined moment, so as to stop the engine in a desired position.

A sensor 7 (or a plurality of sensors) is/are arranged near the flywheel 3, in order to measure the instantaneous speed of rotation of the engine and to determine, at any given moment, the angular position of the flywheel 3 and the crankshaft 2, corresponding to a defined position of each of the pistons inside the in-line cylinders of the engine 1.

The information from the sensor 7 is transmitted to the computer 6, which is programmed to determine, when there is a command to stop the engine, the precise moment at which the order to cut off the injection should be transmitted to the box 5.

In the event of the computer 6 commanding a "stop and start" operation, i.e. a stop and automatic restart of the engine 1 of the motor vehicle, as a function of the traffic conditions, the computer 6 is connected to the control box 4' of the starter 4.

In the case of a spark ignition engine, the ignition control box is also connected to the computer 6. In this case, it is assumed in FIG. 1 that the box 5 controls both the injection of fuel into the cylinders and the ignition of the fuel injected into the cylinders.

During implementation of the "stop and start" operation, the computer 6 receives information which allows it to determine whether an order to stop the engine 1 of the motor vehicle should be given. When the conditions for stopping the engine are combined, the computer 6 determines, from the speed and the angular position of the rotating part 2, 3 of the engine, which are transmitted by sensors, such as the sensor 7, the exact moment at which an order to interrupt the fuel injection and/or to interrupt the ignition should be transmitted to the control box 5.

The program of the computer allows the exact moment to be determined at which the order to interrupt the injection should be transmitted, in order to stop the engine in a well-determined position, which is selected to facilitate the subsequent restarting of the engine.

The stopping position is stored in the computer, to be taken into account in a later restarting of the engine.

In the case of a spark ignition engine, the interruption of the ignition and the interruption of the fuel injection can be controlled simultaneously.

The fuel injection and the ignition can also be interrupted at separate moments. The production of unburned fuel in the cylinders and exhaust line can thus be avoided, which allows exhaust gas pollution to be reduced and deterioration of the catalyst container to be limited.

Generally, the interruption of the injection of fuel into the cylinders of the engine at an optimally determined moment, as a function of the speed and the angular position of the crankshaft, prevents, in particular, the stopping of the engine from being activated in the middle of an injection phase in a cylinder. Exhaust gas pollution is thus reduced and the service life of the catalytic container, in the case of a petrol engine, and of the particulate filter (PF), in the case of a diesel engine, is lengthened. The efficiency of the "stop and start" system is thus improved significantly, and the possibilities of incorporating it into the engine control of the motor vehicle are increased.

From the precise stopping position of the engine, which is stored, it is easy to determine in which cylinder the fuel must be injected first, at the moment of restarting.

It is therefore no longer necessary, as was the case in the prior art, to supply all the cylinders simultaneously, which causes exhaust gas pollution and reduces the service life of the catalytic container (or of the particle filter).

The quantity of fuel injected and the ignition angle of the first combustions are specific to the rapid hot start. This open-loop operation is determined by specific development of the hot restart. The richness control is activated as quickly as possible, in order to prevent pollution. The ignition angle allows, in particular, engine revving to be used in order to improve the quality and the smoothness of the start.

Moreover, restarting is carried out very quickly and with significantly increased regularity, as will be illustrated in greater detail with reference to FIG. 3 and FIG. 6.

Finally, the fact that the position of the crankshaft during starting is optimally determined and known allows an electric starting machine having ideal characteristics to be selected.

Figure 2:
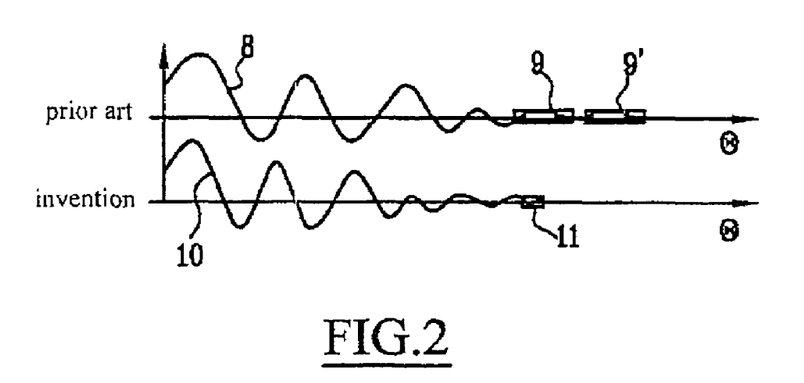
FIG. 2 is a comparative diagram showing the stopping phases of an engine in the case of a stop according to the prior art and, of an engine, the stopping of which is controlled according to the method of the invention.

FIG. 2 shows in diagrammatic form the speed of rotation of the engine as a function of the angular position of the crankshaft and the stopping phases of the engine, in the case of the prior art (upper curve 8) and in the case of the invention (lower curve 10).

In the case of the prior art, stopping can be carried out in two ranges 9 and 9', the angular position of the crankshaft extending either side of a central position, over 30°. There are thus two stopping possibilities, with an inaccuracy of 30° either side of the theoretical stopping position, i.e. four different positions according to the phases, over an engine cycle.

In the case of the invention (lower curve 10), stopping can be carried out in a single range 11 of the angular position of the crankshaft.

Figure 3:
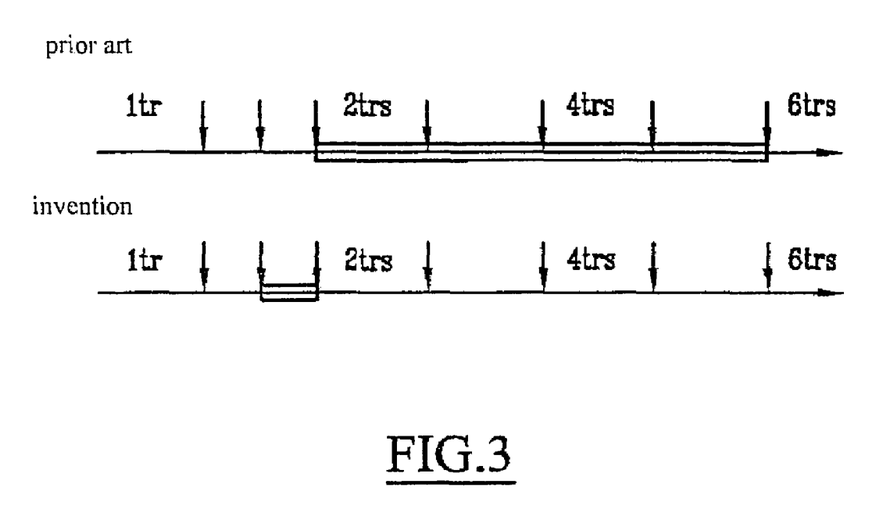
FIG. 3 is a comparative diagram showing the hot reheating phases of an engine controlled according to the prior art and of an engine controlled according to the method of the invention.

As can be seen from FIG. 3, during restarting of the engine after a stop controlled according to the prior art (upper part of the figure), the engine, according to the actual stopping position of the mobile elements of the engine, can be stopped after a number of rotations of the moving rotating part of the engine ranging from two to six.

In the case of a stop programmed and determined according to the invention, restarting with an injection of fuel into a well-determined cylinder allows starting, i.e., a first combustion in the cylinders of the engine, to be achieved in approximately a quarter of a revolution of the crankshaft. If there is no injection during the last revolution before stopping, starting is carried out in one and a quarter revolutions.

The method according to the invention thus allows the use of the starter to be greatly reduced, and restarting to be accelerated, with less exhaust gas pollution.

In the case of a spark ignition engine for rapid hot restarting of the engine, for example in operation of the "stop and start" type, the method of controlling the stopping of the engine according to the invention is used, so as to obtain a programmed stopping position of the mobile elements of the engine, this position being stored by the computer of the motor vehicle.

The stopping of the engine is controlled by the interruption of the fuel injection and/or by the interruption of the ignition, it being possible to give the two corresponding cut-off orders simultaneously or at different moments.

Furthermore, when the engine is stopped, during the last revolution before it stops, fuel feedstock is injected into the inlet manifold of a cylinder of the engine, in the intake phase, in order to prepare the restarting of the engine. This injection is carried out in a precise manner, in a first well-determined position of the rotating part of the engine, and therefore of the piston or pistons in the cylinder or cylinders. At least two injections into inlet manifolds of well-determined cylinders of the engine can also be carried out during stopping.

Furthermore, in order to restart after stopping in a determined position of the mobile elements of the engine, with injection of feedstock into the cylinders of the engine during stopping, ignition of the feedstock is carried out from the first revolution of the crankshaft, by controlling, using a, physical target that is integral with the crankshaft, the precise position of the moving parts of the engine. The ignition of the fuel feedstock is thus controlled in the cylinder stopped in the compression position, then in the cylinder stopped in the intake phase. These ignitions correspond to second well-determined positions of the rotating part of the engine. More generally, a calibrated injection and an ignition of the fuel feedstock are carried out in sequence in the cylinders of the engine, in a predetermined order.

It should be noted that, unlike the case of engines with direct injection of fuel into the cylinders, the injection of feedstock during the stopping of the engine has to be carried out, in the case of engines with indirect injection, into manifolds of cylinders that are well-determined and generally in the intake phase. Injection must also be carried out just before the engine stops, in the last revolution before it stops. The injection of metered feedstock into a well-determined cylinder allows fuel consumption and pollutant emissions in exhaust gases to be reduced.

Figure 4:
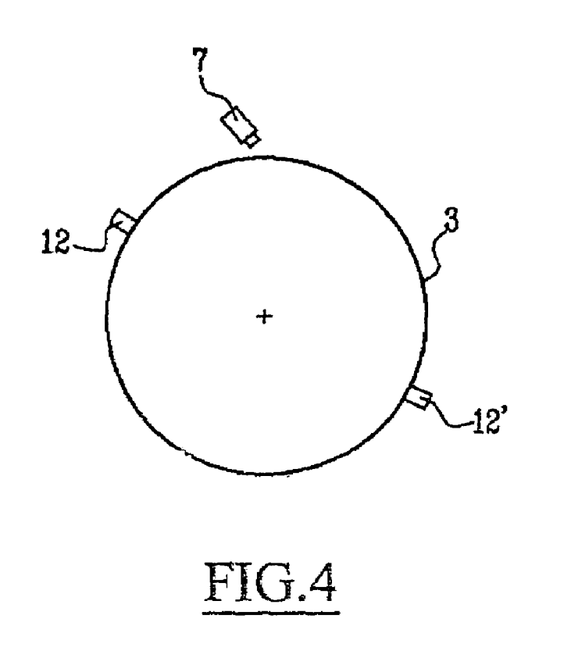
FIG. 4 is a schematic view showing the means for measuring the angular position of a crankshaft of a spark ignition engine, used during a rapid restarting of the engine, according to the method of the invention.

As can be seen from FIG. 4, the flywheel 3, which is integral with the crankshaft 2, carries two targets 12 and 12', placed at 180° from each other, with regard to a revolution about the common axis of the flywheel 3 and the crankshaft 2.

The sensor 7, which is preferably a Hall effect sensor, detects the movement of the targets 12 and 12' into a position corresponding to the top dead center of the pistons in the cylinders of the engine.

During movement of a target, the sensor 7 controls, over a very short time, the charging of one of the coils carrying out the ignition in a cylinder, and causes ignition in the cylinder. Ignition is thus caused in a cylinder in compression very shortly after the engine has been set in rotation for the restart, as a precise stopping position of the engine is obtained and the first cylinder in compression, in which ignition has to be carried out, is determined. Ignition in the first cylinder in compression is carried out after no more than a quarter of a revolution of the crankshaft.

The injection of fuel during the stoppage of the engine can be carried out in such a way as to limit consumption and exhaust gas pollution. Indeed, it is not essential to inject fuel into all the cylinders after the order to stop the engine, but only those which will serve to rapidly restart the engine, i.e., substantially, the cylinder of which the piston stops in the compression phase and optionally that of which the piston stops in the intake phase. The expedient moment for injecting fuel into the desired cylinders can be deduced from the measurement carried out by an appropriate sensor, which may be the sensor 7 shown in FIGS. 1 and 4, of the engine speed during the stop.

In order to control the ignition at the moment of restarting the engine, it is also possible to arrange four targets on the camshaft of the engine and a Hall effect sensor in a position allowing the movement of the targets to be detected.

The Hall effect sensor of the movement of the targets of the camshaft is preferably used to determine the phases in the cylinders of the engine, the Hall effect sensor, which is associated with the flywheel that is integral with the crankshaft, preferably being used to control ignition in the cylinders carrying out the start.

Figure 5:
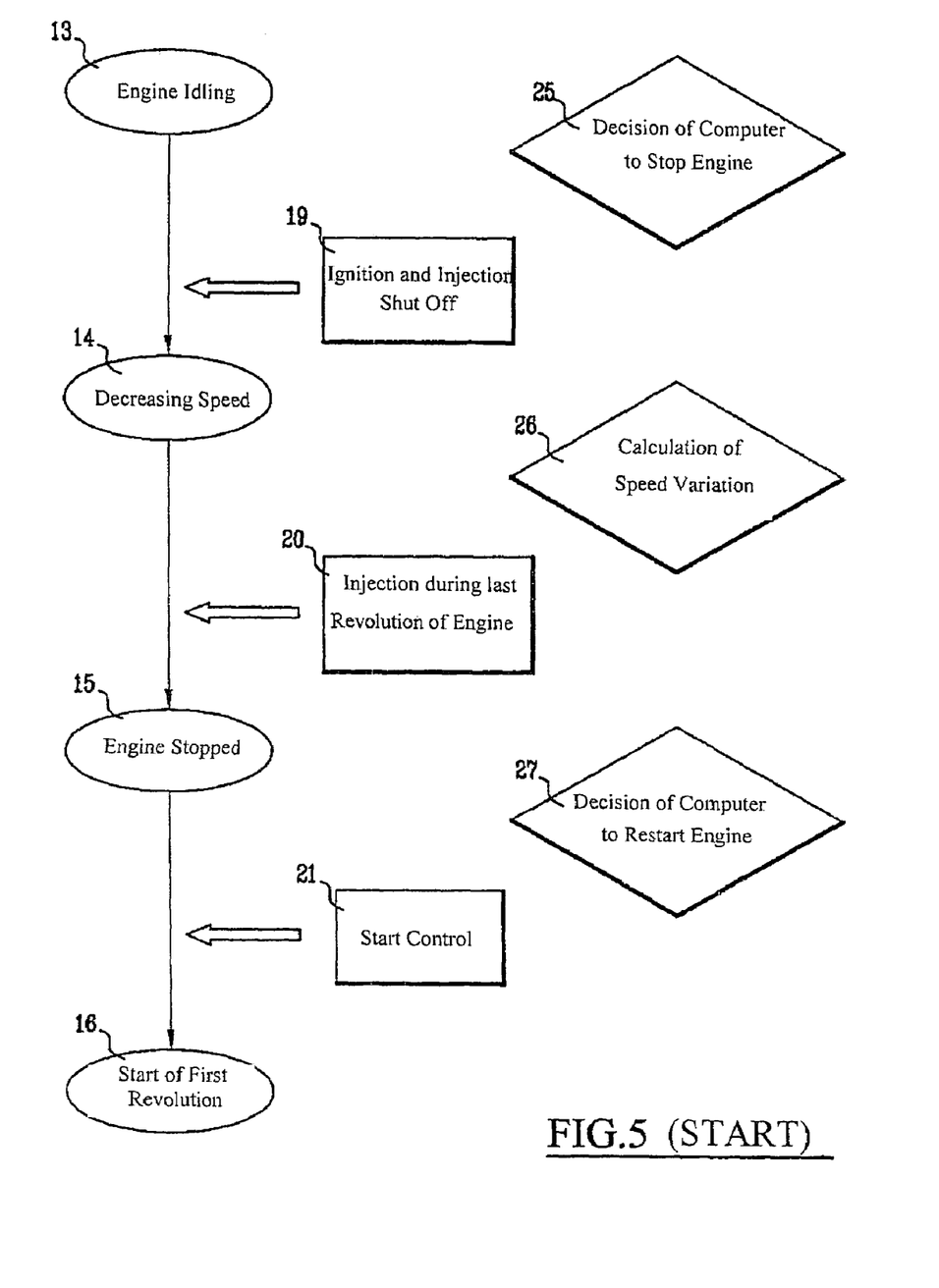
FIG. 5 is a logic diagram showing the course of a method of restarting a spark ignition engine, according to the invention.

The oval shapes on the left-hand side of the logic diagram in FIG. 5 show the various phases of operation of the engine, the rectangles in the central part of the logic diagram show the actions performed on the components of the engine, and the diamonds in the right-hand part of the logic diagram show the actions performed by the computer to stop and start the engine.

The logic diagram in FIG. 5 was designed for a stop and restart, to carry out a "stop and start" operation.

An induction sensor, placed near the flywheel that is integral with the crankshaft, is used to control the ignition and the injections of fuel into the desired cylinders, and a Hall effect sensor of the movement of four targets, which are integral with the camshaft, is used to recognize the phases of the engine.

The various states of the engine, which correspond to the oval shapes in the left-hand part of the logic diagram, are identified by the reference numerals 13 to 18, which correspond to the following actions:

13: the engine rotates at idling speed,
14: the engine decelerates from its idling speed,
15: the engine has stopped,
16: the engine starts its first revolution,
17: acceleration of the engine,
18: the engine has started.

The corresponding functions performed on the engine components are indicated in the rectangular shapes 19 to 24, the meanings of which are given below:

19: cutting-off of the ignition and the injection of the engine,
20: prediction of the stopping phase of the engine and injection of fuel during the last revolution of the engine,
21: control of the starter,
22: ignition in the cylinder $C_1$, stopped in the compression phase,
23: ignition in the cylinder $C_3$, stopped in the intake phase,
24: transition of the computer to standard operation for ignition of the engine.

The actions performed by the computer, shown in the diamond shapes 25 to 30, are as follows:

25: decision of the computer to stop the engine, in order to carry out the "stop and start" operation,
26: calculation of the variations in engine speed from the measurements of the sensor associated with the flywheel, then from the sensor associated with the camshaft, in the last revolutions of the engine,
27: decision of the computer to restart the engine, in order to carry out the "stop and start" operation,
28: start of the charging of a coil upon movement of a target in front of the sensor associated with the camshaft, and injection of fuel into the manifold of the cylinder $C_4$, in the exhaust phase,
29: transition to the calculation of advance and of conventional injection into the engine,
30: checking of the synchronization of the computer with the sensor associated with the crankshaft.

The logic diagram in FIG. 5 and tables 1, 2 and 3 below explain the implementation of the method according to the invention in order to stop and restart a spark ignition engine, in optimal conditions for carrying out the "stop and start" operation.

The sequence of processes in the cylinders will be described in tables 1, 2 and 3, with the following abbreviated references:

Int Intake
Inj Injection
Exh Exhaust
Comp Compression
Comb Combustion
Rel Release
I Ignition
CSt Complete stop of engine Table 1 gives the process sequences in each of the cylinders, during normal operation of the engine.

TABLE 1

| Cylinders | 1 cycle = 2 revolutions of crankshaft (720°) = 4 phases | | | | | |
|---|---|---|---|---|---|---|
| $C_1$ | Exh | Int/Inj | Comp | I Comb/Rel | Exh | Int/Inj |
| $C_2$ | Int/Inj | Comp | I Comb/Rel | Exh | Int/Inj | Comp |
| $C_3$ | I Comb/Rel | Exh | Int/Inj | Comp | I Comb/Rel | Exh |
| $C_4$ | Comp | I Comb/Rel | Exh | Int/Inj | Comp | I Comb/Rel |

The ignition order of the cylinders is as follows: $C_1$, $C_3$, $C_4$, $C_2$, $C_1$, etc.

As the motor vehicle has stopped and the engine is rotating at idling speed, the computer decides to stop the engine in order to carry out the "stop and start" operation. The computer controls the cutting-off of the ignition and the injection (optionally at different moments) The engine decelerates from idling speed and, as the engine stops, the computer determines the variation in the speed of the engine and the stopping position.

During the last revolution of the engine, a single injection of fuel is carried out into at least one of the cylinders, and two fuel feedstocks are generally injected into the cylinder whose piston stops in compression and into the cylinder in which the piston stops in the intake phase. Table 2 gives the process sequences in each of the cylinders $C_1$, $C_2$, $C_3$, and $C_4$, during the stopping phase of the engine.

TABLE 2

| Cylinders | Last revolution CSt | | | |
|---|---|---|---|---|
| $C_1$ | Rel | Exh | Int/Inj | Comp |
| $C_2$ | Exh | Int | Comp | Rel |
| $C_3$ | Comp | Rel | Exh | Int/Inj |
| $C_4$ | Int | Comp | Rel | Exh |

Stopping of the Engine

During the stopping phase of the engine, the injection and the ignition are cut off. There is no combustion.

During the last revolution, fuel is injected into the cylinders in which ignition will be carried out first after restarting, i.e. into the cylinder $C_1$, in which a complete intake phase is carried out during the last revolution of the engine, and which is in the compression phase, at the moment of complete stopping, and in the cylinder $C_3$, in the intake phase, at the moment of stopping.

After the engine has stopped, the computer decides to restart the engine, in order to complete the "stop and start" operation. The computer controls the supply of the starter and the engine starts its first revolution.

During the movement of a target in front of the sensor of the camshaft (Hall effect sensor), the computer controls the start of the charging of an ignition coil corresponding to the cylinder $C_1$, stopped in compression. At the same time, the computer controls an injection of fuel into the manifold of the cylinder $C_4$, stopped in the exhaust phase. Ignition is then carried out in the cylinder $C_1$, stopped in compression, either after a minimal time of charging the coil (timed ignition), or when the high-to-low transition of the signal of the target is identified.

The engine is then accelerated by the displacement of the piston, which had stopped in compression in the cylinder $C_1$.

The computer then proceeds to a conventional method of calculating ignition and injection for control of the engine, this transition being made either at the start of the charging of the coil, by means of the movement of a target in front of the sensor of the camshaft, or by identifying missing teeth on the toothing of the flywheel.

Ignition is then carried out in the cylinder $C_3$, in which the piston had stopped in intake at the moment the engine stopped. The engine is then started and controlled by the computer in the standard operation. The restarting phase is described in table 3 below.

The processes carried out in the cylinders $C_1$, $C_2$, $C_3$ and $C_4$ during restarting are described in table 3.

TABLE 3

| Cylinders | CSt | First revolution | | |
| --- | --- | --- | --- | --- |
| $C_1$ | Comp | I Comb/Rel | Exh | Int/Inj |
| $C_2$ | Rel | Exh | Int/Inj | Comp |
| $C_3$ | Int/Inj | Comp | I Comb/Rel | Exh |
| $C_4$ | Exh | Int/Inj | Comp | I Comb/Rel |

Stopping of the Engine

Ignition is controlled in the cylinder $C_1$, where the air-petrol mixture was prepared before stopping, then compressed, then in the cylinder $C_3$. The other cylinders follow their normal sequence.

The main advantages of the method according to the invention are that it provides a high degree of regularity in the stopping of the engine, with a low dispersion of the stopping position. This is beneficial for restarting the engine, improves synchronization of the injection with the phases of the cylinders of the engine, and reduces exhaust gas pollution.

In the case of a spark ignition engine, the method according to the invention allows starting to be carried out from the first revolution of the crankshaft. This is highly beneficial in the implementation of the "stop and start" operation.

Figure 6:
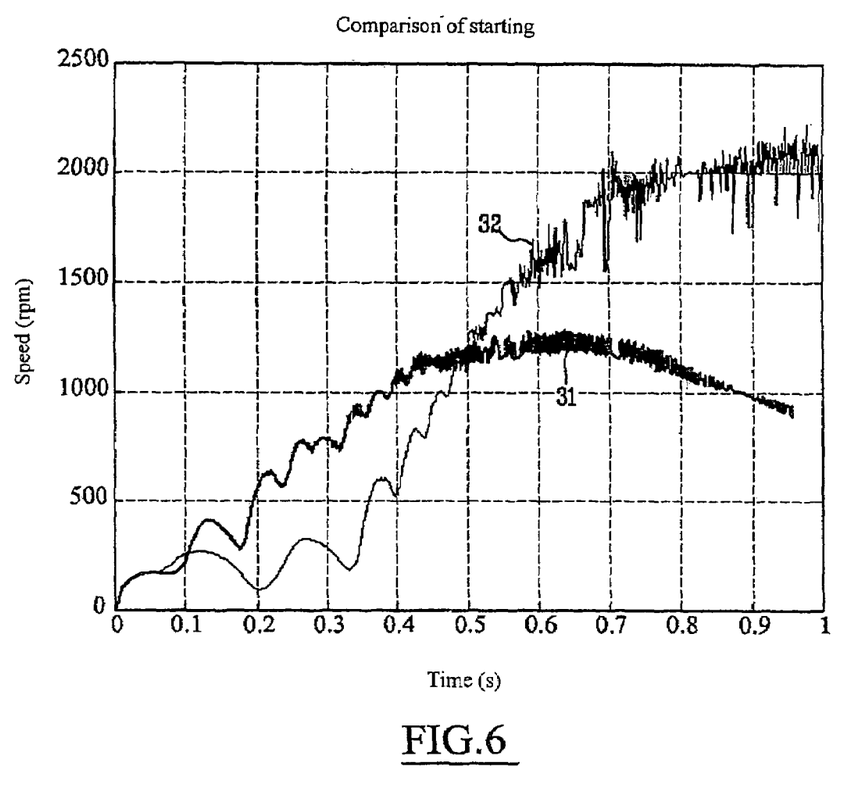
FIG. 6 is a comparative diagram showing the curves of an increase in speed during the starting of an engine by the method of the invention and by a method according to the prior art.

FIG. 6 shows the variations in the speed of an engine with indirect injection and spark ignition, as a function of time, during a hot restart, in the case of a stop and restart carried out according to the invention (curve 31) or according to a common technique of implementing the "stop and start" operation (curve 32).

In the case of the method according to the invention, a stable speed is reached more quickly and at a substantially lower level of engine speed.

Rotational overspeeding of the engine at the moment of starting (overshoot), as well as fuel consumption and pollutant emissions from the exhaust, are thus limited significantly.

Starting is also smoother, which is of great importance as far as comfort in the engine-powered motor vehicle and long-term maintenance of the engine are concerned.

In particular, precise calibration of the sequential injections carried out into cylinders and of the ignition at the moment of restarting allows a smooth restart to be obtained by limiting oscillations, by controlling the injected quantities and the opening times of the intake valves.

Precise control of the injections and the ignition during starting allows oscillations to be reduced.

The invention is not strictly limited to the embodiments that have been described.

The angular position of the crankshaft or the camshaft of the engine can thus be identified in a different manner from those which have been described, by using any type of target and appropriate sensor.

The measurements of speed and of the position of the crankshaft can be carried out by any means present in the motor vehicle, or by any specific means used to carry out the method of the invention.

In the case of a spark ignition engine, the injections during the phase leading to the stopping of the engine must be carried out in a very precise manner, which can necessitate the use of particular means.

The invention applies to any engine with indirect injection and spark ignition.

In the case of a spark ignition engine, the engine can be stopped by interrupting the ignition and/or the injection, it being possible to carry out these two processes simultaneously or separately. Upon restarting, the ignition control at a precise moment in the cylinder in compression, at the moment when the engine stops, then in the cylinder in the intake position during stopping, allows the engine to be started from the first revolution of the crankshaft, in a reproducible manner.

The invention applies, in particular, to motor vehicles of which the computer allows the "stop and start" operation to be performed in order to stop and restart the engine, in an automatic manner.

The invention claimed is:

1. Method of stopping and restarting an internal combustion engine with indirect injection and spark ignition, comprising at least one cylinder, in which a piston, a fuel inlet manifold communicating with the cylinder and a rotating part set in rotation by the piston, via a connecting rod, move, wherein:

the speed of rotation and the position of the piston and of the rotating part of the engine are measured continuously, and the fuel injection is cut off at predetermined speed and angular position values of the rotating part of the engine in order to stop the piston and the rotating part in a predetermined position, a fuel feedstock is injected into the inlet manifold of one of the cylinders which is in the intake phase, during the last revolution of the engine before it stops in a predetermined position, upon restarting the engine, after it has stopped, by setting the rotating part of the engine in rotation, the implementation of the compression phase in the cylinder is identified and ignition of the feedstock is carried out in the cylinder in the compression phase, and the successive feedstock injection and ignition in at least one cylinder are carried out according to a predetermined sequence, in order to optimize consumption and emissions and to limit overspeeding of the engine during starting, thus improving the quality of the start.

2. Method according to claim 1, wherein the speed and the angular position of the rotating part of the engine are measured using at least one sensor, which senses the speed and the angular position of a flywheel that is integral with a crankshaft of the engine.

3. Method according to claim 1, wherein:

the speed of rotation and the angular position of the rotating part of the engine are measured continuously, and in order to stop the mobile parts of the engine in a predetermined position that facilitates restarting of the engine, the ignition and/or fuel injection is/are interrupted at predetermined speed and angular position values of the rotating part of the engine.

4. Method according to claim 3, wherein the speed and angular position of the rotating part of the engine are determined using a sensor, which senses the speed and the angular position of a flywheel that is integral with a crankshaft of the engine and/or a camshaft for controlling the valves of the engine.

5. Method according to claim 1, wherein the engine is restarted in no more than a quarter revolution of the assembly of the engine, and in one and a quarter revolutions if injection is not carried out during the last revolution before stopping.

6. Method according to claim 1, in the case of an engine comprising a plurality of cylinders, and preferably four cylinders, in line, wherein, during the last revolution before the engine stops, preceding the restart, fuel feedstocks are injected into the inlet manifold of the cylinder of the engine, in which the piston is in the intake position during the last revolution before the engine stops and in the compression position at the moment of stopping, and into a second cylinder of the engine, in the intake phase, at the moment of stopping.

7. Method according to claim 1, wherein, in order to restart the engine, ignition is carried out in the cylinder, the piston of which is in the compression position at the moment when the engine stops, then in the cylinder, in which the piston is in the intake position at the moment when the engine stops.

8. Method according to claim 1, wherein the sequential injections and the ignition to be carried out during the restart are precisely calibrated, and the sequential injections and the ignition are carried out according to the values obtained from the calibration.

9. Method according to claim 8, wherein the quantities of fuel to be injected sequentially into the cylinders and the ignition angles, during restarting of the engine, are determined from the calibration.

10. Method according to claim 2, wherein:
the speed of rotation and the angular position of the rotating part of the engine are measured continuously, and
in order to stop the mobile parts of the engine in a predetermined position that facilitates restarting of the engine, the ignition and/or fuel injection is/are interrupted at predetermined speed and angular position values of the rotating part of the engine.

11. Method according to claim 10, wherein the speed and angular position of the rotating part of the engine are determined using a sensor, which senses the speed and the angular position of a flywheel that is integral with a crankshaft of the engine and/or a camshaft for controlling the valves of the engine.

12. Method according to claim 2, in the case of an engine comprising a plurality of cylinders, and preferably four cylinders, in line, wherein, during the last revolution before the engine stops, preceding the restart, fuel feedstocks are injected into the inlet manifold of the cylinder of the engine, in which the piston is in the intake position during the last revolution before the engine stops and in the compression position at the moment of stopping, and into a second cylinder of the engine, in the intake phase, at the moment of stopping.

13. Method according to claim 3, in the case of an engine comprising a plurality of cylinders, and preferably four cylinders, in line, wherein, during the last revolution before the engine stops, preceding the restart, fuel feedstocks are injected into the inlet manifold of the cylinder of the engine, in which the piston is in the intake position during the last revolution before the engine stops and in the compression position at the moment of stopping, and into a second cylinder of the engine, in the intake phase, at the moment of stopping.

14. Method according to claim 4, in the case of an engine comprising a plurality of cylinders, and preferably four cylinders, in line, wherein, during the last revolution before the engine stops, preceding the restart, fuel feedstocks are injected into the inlet manifold of the cylinder of the engine, in which the piston is in the intake position during the last revolution before the engine stops and in the compression position at the moment of stopping, and into a second cylinder of the engine, in the intake phase, at the moment of stopping.

15. Method according to claim 5, in the case of an engine comprising a plurality of cylinders, and preferably four cylinders, in line, wherein, during the last revolution before the engine stops, preceding the restart, fuel feedstocks are injected into the inlet manifold of the cylinder of the engine, in which the piston is in the intake position during the last revolution before the engine stops and in the compression position at the moment of stopping, and into a second cylinder of the engine, in the intake phase, at the moment of stopping.

16. Method according to claim 2, wherein, in order to restart the engine, ignition is carried out in the cylinder, the piston of which is in the compression position at the moment when the engine stops, then in the cylinder, in which the piston is in the intake position at the moment when the engine stops.

17. Method according to claim 3, wherein, in order to restart the engine, ignition is carried out in the cylinder, the piston of which is in the compression position at the moment when the engine stops, then in the cylinder, in which the piston is in the intake position at the moment when the engine stops.

18. Method according to claim 4, wherein, in order to restart the engine, ignition is carried out in the cylinder, the piston of which is in the compression position at the moment when the engine stops, then in the cylinder, in which the piston is in the intake position at the moment when the engine stops.

19. Method according to claim 3, wherein the sequential injections and the ignition to be carried out during the restart are precisely calibrated, and the sequential injections and the ignition are carried out according to the values obtained from the calibration.

20. Method according to claim 5, wherein the sequential injections and the ignition to be carried out during the restart are precisely calibrated, and the sequential injections and the ignition are carried out according to the values obtained from the calibration.

* * * * *